United States Patent
Rao et al.

(10) Patent No.: US 9,363,343 B2
(45) Date of Patent: Jun. 7, 2016

(54) AUDIO JACK CONNECTOR INTEGRATED INTO ENCLOSURE

(71) Applicant: Apple Inc., Cupertino, CA (US)

(72) Inventors: Matthew P. Rao, San Francisco, CA (US); Stefan C. Mag, San Francisco, CA (US); Trent K. Do, Milipitas, CA (US)

(73) Assignee: APPLE INC., Cupertino, CA (US)

( * ) Notice: Subject to any disclaimer, the term of this patent is extended or adjusted under 35 U.S.C. 154(b) by 102 days.

(21) Appl. No.: 14/473,781

(22) Filed: Aug. 29, 2014

(65) Prior Publication Data

US 2016/0065703 A1 Mar. 3, 2016

(51) Int. Cl.
*H01R 13/502* (2006.01)
*H01R 13/514* (2006.01)
*H04M 1/02* (2006.01)
*H04B 1/3888* (2015.01)
*H04B 1/38* (2015.01)

(52) U.S. Cl.
CPC ........... *H04M 1/0274* (2013.01); *H04B 1/3888* (2013.01); *H04B 2001/3894* (2013.01)

(58) Field of Classification Search
CPC . H05K 5/0004; H05K 5/0013; H05K 5/0021; H05K 5/0047; H05K 5/0052; H05K 9/0032; H01R 13/66; H01R 13/627; H01R 13/502; H01R 13/514; H01R 1/0274; H01R 1/3888; H01R 2001/3894
USPC ................. 439/686, 687, 695, 701, 751, 731, 439/20.01, 620.1, 620.28; 174/520, 537
See application file for complete search history.

(56) References Cited

U.S. PATENT DOCUMENTS

| | | | | |
|---|---|---|---|---|
| 6,776,626 | B2 * | 8/2004 | Huang | H04M 1/0249 439/76.1 |
| 7,141,738 | B2 * | 11/2006 | Marsac | G02B 6/4446 174/92 |
| 7,149,089 | B2 | 12/2006 | Blasko et al. | |
| 7,285,725 | B1 * | 10/2007 | Saman | H01R 13/6392 174/84 R |
| 7,697,281 | B2 * | 4/2010 | Dabov | G06F 1/1626 361/679.55 |
| 8,476,540 | B2 | 7/2013 | Dahl et al. | |
| 8,772,650 | B2 | 7/2014 | Merz et al. | |
| 2009/0067141 | A1 * | 3/2009 | Dabov | H01Q 1/243 361/753 |
| 2010/0216526 | A1 | 8/2010 | Chen et al. | |
| 2011/0068665 | A1 | 3/2011 | Cao | |
| 2014/0060917 | A1 | 3/2014 | Woodhull et al. | |

FOREIGN PATENT DOCUMENTS

EP  1133222 A1  9/2001

OTHER PUBLICATIONS

International Search Report and Written Opinion for International PCT Application No. PCT/US2013/055716, mailed Nov. 4, 2013, 10 pages.
Non-Final Office Action for U.S. Appl. No. 13/969,378, mailed Mar. 4, 2015, 13 pages.
International Preliminary Report on Patentability for International PCT Application No. PCT/US2013/055716, mailed Mar. 12, 2015, 7 pages.

* cited by examiner

*Primary Examiner* — Abdullah Riyami
*Assistant Examiner* — Harshad Patel
(74) *Attorney, Agent, or Firm* — Kilpatrick Townsend & Stockton LLP

(57) ABSTRACT

An electronic device enclosure that includes a housing and a frame and an integrally formed connector shell. The connector shell includes a first portion integrally formed with the housing and a second portion integrally formed with the frame. The first and second portions of the connector shell are joined at first and second mating surfaces, respectively, forming a cavity therebetween in which a plurality of receptacle connector contacts are positioned.

18 Claims, 6 Drawing Sheets

AUDIO JACK CONNECTOR INTEGRATED INTO ENCLOSURE

BACKGROUND OF THE INVENTION

The present invention relates generally to enclosures for electronic devices, and in particular enclosures including electrical connectors such as a receptacle connector for receiving an audio connector or plug.

Many electronic devices include electrical connectors that receive data and, in some cases, receive and provide power and data. These electrical connectors are typically receptacle connectors and are designed to receive a male plug connector. The male plug connector may be on the end of a cable or part of an accessory, such as a docking station or stereo receiver. The plug connector may plug into the receptacle connector, thereby forming one or more conductive paths for signals and/or power.

Receptacle connectors often have a shell that surrounds and provides mechanical support for contacts of the receptacle connector. Receptacle connector shells are typically made from a dielectric material such as plastics. The contacts may be arranged to mate with corresponding contacts on the plug connector, e.g., an audio plug, to form portions of electrical paths between devices.

These receptacle connectors, e.g., audio jacks, are often manufactured separately from the enclosure and sometimes by a manufacturer different than the enclosure manufacturer. These off-the-shelf receptacle connectors may be attached with screws or otherwise fixed to an enclosure of an electronic device. Some receptacle connectors are customized for use within a specific electronic device or a group of electronic devices. These custom receptacle connectors may also be manufactured separately from the enclosure and inserted into the enclosure during the assembly process of the electronic device.

As electronic devices continue to become smaller and thinner, the housing of an off-the-shelf or custom receptacle connector may take up an undesirably high percentage of the overall limited internal space within the enclosure and/or be a limit on how thin the enclosure can be made.

BRIEF SUMMARY OF THE INVENTION

The present invention relates generally to enclosures for electronic devices, and in particular enclosures integrally formed with a receptacle connector shell for receiving electrical connectors such as audio plug connectors. In some embodiments, the receptacle connector shell is formed from first and second sections that are integrally formed with bottom and top portions of an enclosure, respectively. The first and second sections can be aligned so that when the bottom and top portions of the enclosure are joined together, the first and second sections form a receptacle connector shell integral with the enclosure. In this manner, the overall amount of space the receptacle connector takes up within the enclosure can be reduced and the enclosure can be thinner than a similar enclosure that includes a separate receptacle connector shell instead. Additionally, enclosure designs according to some embodiments of the present invention may provide excellent sealing between the receptacle connector shell and the enclosure thus protecting against liquid ingress and may also provide a structurally robust receptacle connector shell having reduced material requirements and reduced assembly time.

According to one embodiment, an electronic device enclosure is provided. The electronic device enclosure includes a housing having a back portion and an outer sidewall extending from the back portion around an outer periphery of the electronic device enclosure. An opening is formed in the outer sidewall that communicates with a cavity in which a plurality of contacts are positioned. The enclosure further includes a frame coupled to the housing and configured to receive a display cover. A first section of a connector shell is integrally formed with the back portion and outer sidewall and extends from the back portion towards the frame. The first section includes a first mating surface and a first interior surface, the first mating surface extending around a periphery of the first section and surrounding the first interior surface except at the opening. A second section of the connector shell is integrally formed with the frame and extends from the frame towards the back portion. The second section includes a second mating surface and a second interior surface. The second mating surface extends around a periphery of the second section and surrounds the second interior surface except at the opening and is aligned with the first mating surface so that the first and second interior surfaces combine to form the cavity.

According to another embodiment, an electronic device enclosure is provided. The electronic device enclosure can include a housing having a back portion, an outer sidewall extending from the back portion around an outer periphery of the electronic device enclosure, and an opening in the outer sidewall that communicates with a cavity in which a plurality of receptacle connector contacts are positioned. The outer sidewall includes an upper edge around its periphery and a seat extending along an interior surface of the outer sidewall proximate to the edge. The enclosure further includes a frame supported by the seat and having a window for a display cover, and a connector shell that includes a first section integrally formed with the housing and a second section integrally formed with the frame. The first section includes a first mating surface and a first interior surface where the first mating surface extends around a periphery of the first section and surrounds the first interior surface except at the opening. The second section includes a second mating surface and a second interior surface. The second mating surface extending around a periphery of the second section and surrounding the second interior surface except at the opening, and where the first and second mating surfaces are aligned with each other and the first and second interior surfaces combine to form the cavity.

Although aspects of the invention are described herein primarily in relation to enclosures integrally formed with an audio jack, it is appreciated that the described features, aspects and methods can be used in a variety of different environments, regardless of receptacle connector size or type. For example, the enclosures described herein may be integrally formed with a variety of different electrical connector shells, which may use a variety of different connector technologies including standard Universal Serial Bus (USB), High-Definition Multimedia Interface (HDMI), Digital Visual Interface (DVI), DisplayPort, Thunderbolt, FireWire, power, Ethernet connectors, as well as various proprietary connectors, such as Apple's proprietary 30-pin connector or Lightening connector, used with common electronics. The invention may also apply to internal connectors or other connections between components within the enclosure of an electronic device. Additionally, while the invention is primarily described with respect to an enclosure for portable media devices, the invention may apply to devices such as tablets, laptops, netbooks, desktops, all-in-one computers, storage devices, navigation systems, monitors, among other electronic devices.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Before describing the present invention, electronic devices in which the invention may be implemented and examples of audio connectors or plugs corresponding to receptacle connectors for which embodiments of the invention are particularly useful are first described.

Figure 1:
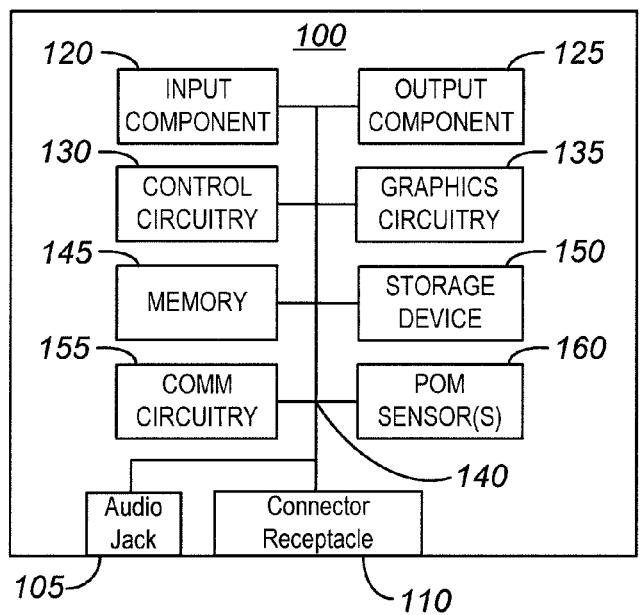
FIG. 1 illustrates a simplified illustrative block diagram representing an electronic media device that includes an audio receptacle connector according to embodiments of the present invention.

FIG. 1 is a simplified illustrative block diagram representing an electronic media device 100 that includes an audio receptacle connector 105 according to embodiments of the present invention. Electronic media device 100 may also include, among other components, connector receptacle 110, one or more user input components 120, one or more output components 125, control circuitry 130, graphics circuitry 135, a bus 140, a memory 145, a storage device 150, communications circuitry 155 and POM (position, orientation or movement sensor) sensors 160. Control circuitry 130 may communicate with the other components of electronic media device 100 (e.g., via bus 140) to control the operation of electronic media device 100. In some embodiments, control circuitry 130 may execute instructions stored in a memory 145. Control circuitry 130 may also be operative to control the performance of electronic media device 100. Control circuitry 130 may include, for example, a processor, a microcontroller and a bus (e.g., for sending instructions to the other components of electronic media device 100). In some embodiments, control circuitry 130 may also drive the display and process inputs received from input component 120.

Memory 145 may include one or more different types of memory that may be used to perform device functions. For example, memory 145 may include cache, flash memory, ROM, RAM and hybrid types of memory. Memory 145 may also store firmware for the device and its applications (e.g., operating system, user interface functions and processor functions). Storage device 150 may include one or more suitable storage mediums or mechanisms, such as a magnetic hard drive, flash drive, tape drive, optical drive, permanent memory (such as ROM), semi-permanent memory (such as RAM) or cache. Storage device 150 may be used for storing media (e.g., audio and video files), text, pictures, graphics, advertising or any suitable user-specific or global information that may be used by electronic media device 100. Storage device 150 may also store programs or applications that may run on control circuitry 130, may maintain files formatted to be read and edited by one or more of the applications and may store any additional files that may aid the operation of one or more applications (e.g., files with metadata). It should be understood that any of the information stored on storage device 150 may instead be stored in memory 145.

Electronic media device 100 may also include input component 120 and output component 125 for providing a user with the ability to interact with electronic media device 100. For example, input component 120 and output component 125 may provide an interface for a user to interact with an application running on control circuitry 130. Input component 120 may take a variety of forms, such as a keyboard/keypad, trackpad, mouse, click wheel, button, stylus or touch screen. Input component 120 may also include one or more devices for user authentication (e.g., a smart card reader, a fingerprint reader or an iris scanner) as well as an audio input device (e.g., a microphone) or a video input device (e.g., a camera or a web cam) for recording video or still frames. Output component 125 may include any suitable display, such as a liquid crystal display (LCD) or a touch screen display, a projection device, a speaker or any other suitable system for presenting information or media to a user. Output component 125 may be controlled by graphics circuitry 135. Graphics circuitry 135 may include a video card, such as a video card with 2D, 3D or vector graphics capabilities. In some embodiments, output component 125 may also include an audio component that is remotely coupled to electronic media device 100. For example, output component 125 may include a headset, headphones or ear buds that may be coupled to electronic media device 100 with a wire or wirelessly (e.g., Bluetooth headphones or a Bluetooth headset).

Electronic media device 100 may have one or more applications (e.g., software applications) stored on storage device 150 or in memory 145. Control circuitry 130 may be configured to execute instructions of the applications from memory 145. For example, control circuitry 130 may be configured to execute a media player application that causes full-motion video or audio to be presented or displayed on output component 125. Other applications resident on electronic media device 100 may include, for example, a telephony application, a GPS navigator application, a web browser application and a calendar or organizer application. Electronic media device 100 may also execute any suitable operating system, such as Mac OS, Apple iOS, Linux or Windows and can include a set of applications stored on storage device 150 or memory 145, which applications may be compatible with the operating system running on the device.

In some embodiments, electronic media device 100 may also include communications circuitry 155 to connect to one or more communications networks. Communications circuitry 155 may be any suitable communications circuitry operative to connect to a communications network and to transmit communications (e.g., voice or data) from electronic media device 100 to other devices within the communications network. Communications circuitry 155 may be operative to interface with the communications network using any suitable communications protocol such as, for example, Wi-Fi (e.g., a 802.11 protocol), Bluetooth, high frequency systems (e.g., 900 MHz, 2.4 GHz and 5.6 GHz communication systems), infrared, GSM, GSM plus EDGE, CDMA, quadband and other cellular protocols, VOIP or any other suitable protocol.

In some embodiments, communications circuitry 155 may be operative to create a communications network using any suitable communications protocol. Communications circuitry 155 may create a short-range communications network using a short-range communications protocol to connect to other devices. For example, communications circuitry 155 may be operative to create a local communications network using the Bluetooth protocol to couple with a Bluetooth headset (or any other Bluetooth device). Communications circuitry 155 may also include a wired or wireless network interface card (NIC) configured to connect to the Internet or any other public or private network. For example, electronic media device 100 may be configured to connect to the Internet via a wireless network, such as a packet radio network, an RF network, a cellular network or any other suitable type of network. Communication circuitry 145 may be used to initiate and conduct communications with other communications devices or media devices within a communications network.

Electronic media device 100 may also include any other component suitable for performing a communications operation. For example, electronic media device 100 may include a power supply, an antenna, ports or interfaces for coupling to a host device, a secondary input mechanism (e.g., an ON/OFF switch) or any other suitable component.

Electronic media device 100 may also include POM sensors 160. POM sensors 160 may be used to determine the approximate geographical or physical location of electronic media device 100. As described in more detail below, the location of electronic media device 100 may be derived from any suitable trilateration or triangulation technique, in which case POM sensors 160 may include an RF triangulation detector or sensor or any other location circuitry configured to determine the location of electronic media device 100.

POM sensors 160 may also include one or more sensors or circuitry for detecting the position orientation or movement of electronic media device 100. Such sensors and circuitry may include, for example, single-axis or multi-axis accelerometers, angular rate or inertial sensors (e.g., optical gyroscopes, vibrating gyroscopes, gas rate gyroscopes or ring gyroscopes), magnetometers (e.g., scalar or vector magnetometers), ambient light sensors, proximity sensors, motion sensors (e.g., a passive infrared (PIR) sensor, active ultrasonic sensor or active microwave sensor) and linear velocity sensors. For example, control circuitry 130 may be configured to read data from one or more of POM sensors 160 in order to determine the location orientation or velocity of electronic media device 100. One or more of POM sensors 160 may be positioned near output component 125 (e.g., above, below or on either side of the display screen of electronic media device 100).

Figure 2:
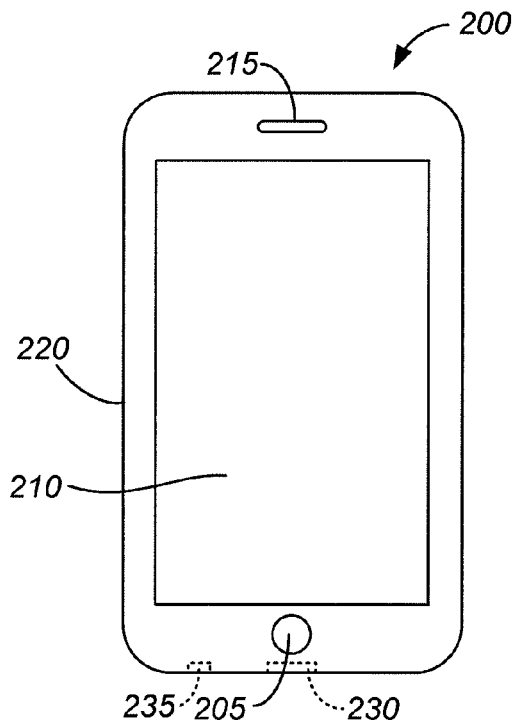
FIG. 2 illustrates a rendering of one particular electronic media device.

FIG. 2 depicts an illustrative rendering of one particular electronic media device 200 that may include an enclosure having an integral receptacle connector according to embodiments of the invention. Device 200 includes a multipurpose button 205 as an input component, a touch screen display 210 as both an input and output component, and a speaker 215 as an output component, all of which are housed within a device housing 220. Device 200 also includes a primary receptacle connector 230 and an audio receptacle connector 235 or audio jack within device housing 220. Each of the receptacle connectors 230 and 235 can be positioned within housing 220 such that an opening of the receptacle connectors 230, 235 into which a corresponding plug connector is inserted is located at an exterior surface of the device housing. In some embodiments, these openings may be located at an exterior side surface of device 200. For simplicity, various internal components, such as the control circuitry, graphics circuitry, bus, memory, storage device and other components are not shown in FIG. 2.

Electronic media device 200 may be a portable computing device, a tablet, a smart or media phone, or a portable media player. However, as discussed earlier, embodiments of the present invention may be implemented in laptops, desktops, all-in-one computers, cell phones, storage devices, navigation systems, monitors and other electronic devices.

Embodiments of the invention disclosed herein pertain to an enclosure 220 that is integrally formed with audio receptacle connector 235, but in other embodiments the enclosure may be integrally formed with receptacle connector 230, such as Apple's Lightning receptacle connector. Additionally, in some embodiments, enclosure 220 may only include a single receptacle connector 230 (as opposed to the two receptacle connectors 230, 235 shown in FIG. 2) that is used to connect to other electronic devices. In these embodiments, the enclosure may be integrally formed with just receptacle connector 230.

Embodiments of the present invention may include a receptacle connector for receiving an audio connector or plug, e.g., a standard audio connector or plug. Standard audio plugs are available in three sizes according to the outside diameter of the plug: a 6.35 mm (¼") plug, a 3.5 mm (⅛") miniature plug and a 2.5 mm (3/32") subminiature plug. The plugs include multiple conductive regions that extend along the length of the connectors in distinct portions of the plug such as the tip, sleeve and one or more middle portions between the tip and sleeve resulting in the connectors often being referred to as TRS (tip, ring and sleeve) connectors.

Figure 3A:
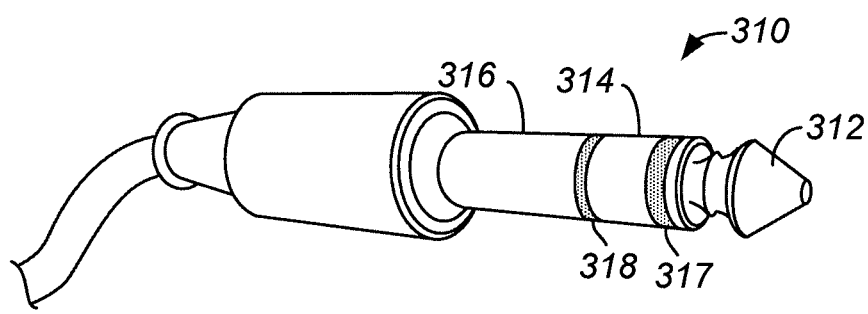
FIGS. 3A-B illustrate examples of audio plugs having three and four conductive portions, respectfully.
Figure 3B:
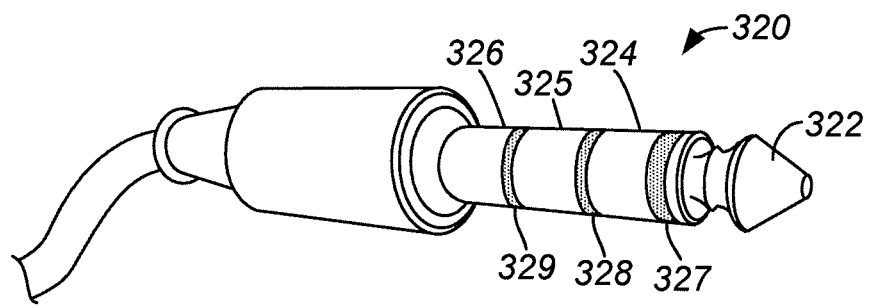

FIGS. 3A and 3B illustrate examples of audio plugs 310 and 320 having three and four conductive portions, respectfully. As shown in FIG. 3A, plug 310 includes a conductive tip 312, a conductive sleeve 316 and a conductive ring 314 electrically isolated from the tip 312 and the sleeve 316 by insulating rings 317 and 318. The three conductive portions 312, 314, 316 are for left and right audio channels and a ground connection, respectively. Plug 320, shown in FIG. 3B, includes four conductive portions: a conductive tip 322, a conductive sleeve 326 and two conductive rings 324, 325 and is thus sometime referred to as a TRRS (tip, ring, ring, sleeve) connector. The four conductive portions 322, 324, 325 and 326 are electrically isolated by insulating rings 327, 328 and 329 and are typically used for left and right audio, ground and microphone signals, respectively.

When plugs 310 and 320 are 3.5 mm miniature connectors, the outer diameter of conductive sleeve 316, 326 and conductive rings 314, 324, 325 is 3.5 mm and the insertion length of the connector is 14 mm. For 2.5 mm subminiature connectors, the outer diameter of the conductive sleeve is 2.5 mm and the insertion length of the connector is 11 mm long. Such TRS and TRRS connectors are used in many commercially available MP3 players and smart phones as well as other electronic devices. Electronic devices such as MP3 players and smart phones are continuously being designed to be thinner and smaller and/or to include video displays with screens that are pushed out as close to the outer edge of the devices as possible. The diameter and length of current 3.5 mm and even 2.5 mm audio connectors are limiting factors in making such devices smaller and thinner and in allowing the displays to be larger for a given form factor.

The sizes of corresponding receptacle connectors or audio jacks for the standard audio plugs connectors described above are also limiting factors in making portable electronic devices smaller. An example of traditional 3.5 mm audio jacks mounted within an enclosure of an electronic device is shown in the following figures.

Figure 4A:
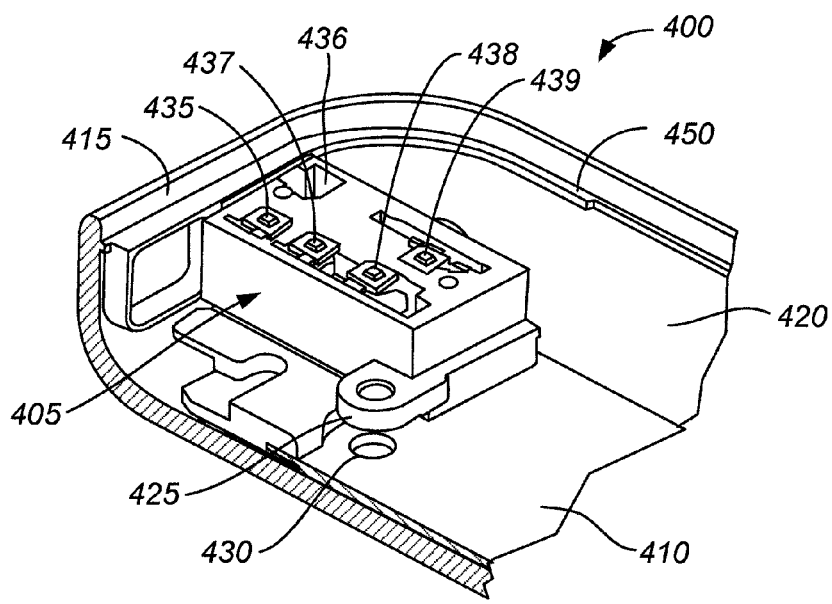
FIG. 4A illustrates a sectional perspective view of a traditional electronic device enclosure having an audio jack mounted thereon.

FIG. 4A illustrates a perspective view of a section of a traditional electronic device enclosure 400 having an audio jack 405 mounted thereon. Enclosure 400 includes a back portion 410 having bottom and left walls 415, 420 as well as top and right walls (not shown in FIG. 4A). Bottom wall 415 includes an opening (opening 465 shown in FIG. 4B) for access to audio jack 405.

Audio jack 405 is assembled on back portion 410, adjacent to an opening (opening 465 in FIG. 4B) on bottom wall 415. Audio jack 405 is mounted to back portion 410 via a screw (not shown in FIG. 4B) that is threaded through audio jack bracket 425 and threaded opening 430. Audio jack 405 also includes contacts 435-439 for mating with corresponding contacts on a standard audio plug.

Figure 4B:
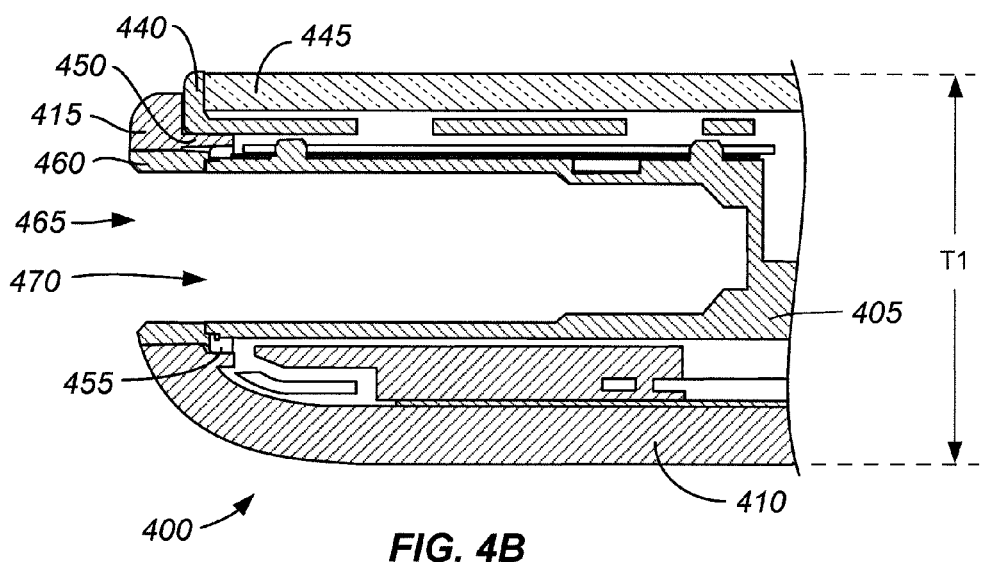
FIG. 4B illustrates a cross-sectional view of a section of a traditional enclosure having an audio jack mounted thereon and having a cover glass frame and a cover glass assembled therewith.

FIG. 4B illustrates a cross-sectional view of a section of traditional electronic device enclosure 400 having audio jack 405 mounted thereon and having a cover glass frame 440 and a cover glass 445 assembled therewith. Cover glass frame 440 and cover glass 445 are held in position by shelf 450 and other interlocking features (not shown in FIG. 4B). As shown in FIG. 4B, an opening 470 of audio jack 405 is registered with opening 465 of bottom wall 415. Trim gasket 455 surrounds opening 470 and is intended to seal gaps between enclosure 400 and audio jack 405 in order to limit liquid ingress. A trim 460 may be included that surrounds opening 465. A standard audio plug may be inserted through opening 465 and into opening 470 in order for its contacts to mate with corresponding contacts 435-439 (not shown in FIG. 4B) of audio jack 405. The inclusion of separate audio jack 405 within enclosure 400 results in enclosure 400 having a depth or thickness of T1.

Figure 5:
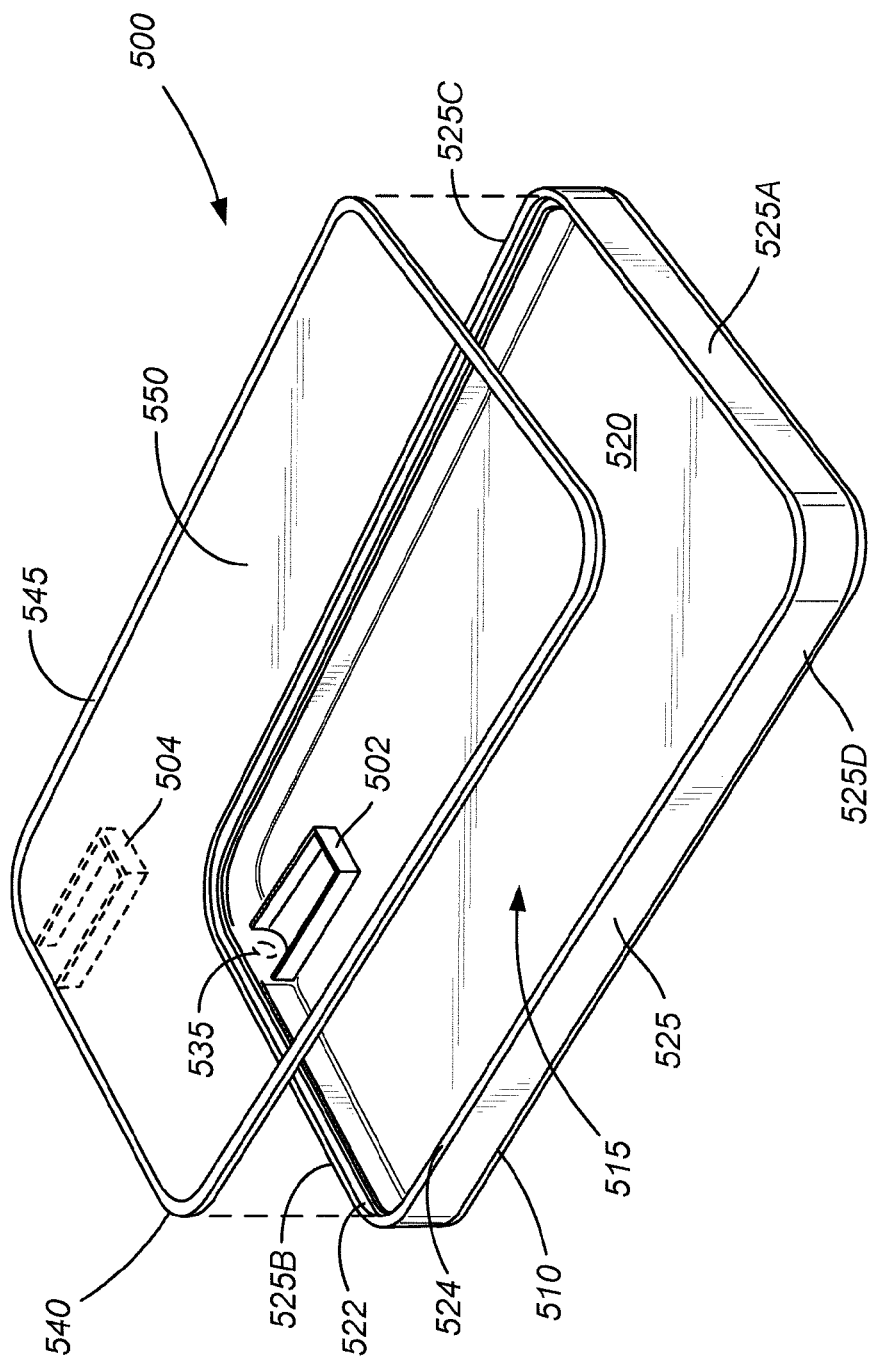
FIG. 5 illustrates a simplified perspective view of a partially formed electronic device enclosure having an integrally formed audio jack shell according to one embodiment of the invention.

FIG. 5 illustrates a simplified perspective view of an electronic device enclosure 500 having an integrally formed audio jack shell according to an embodiment of the present invention. Enclosure 500 includes a housing 510 and a front cover portion 540. In FIG. 5, housing 510 is depicted as being spaced apart from front cover portion 540 prior to the two components being assembled together. The audio jack shell is integrally formed with enclosure 500 and includes a first section 502 integrally formed with housing 510 and a second section 504 integrally formed with front cover portion 540. Once components 510 and 540 are assembled, sections 502 and 504 are joined together to form audio jack shell 505 as shown in FIG. 7B.

Housing 510 includes a back portion 520 and an outer sidewall 525 that extends from back portion 520 around an outer periphery of device enclosure 500. Since enclosure 500 has a generally rectangular shape, sidewall 525 defines a generally rectangular opening 515 into which front cover portion 540 fits as described below. Sidewall 525 includes top and bottom opposing walls 525A, 525B and left and right opposing walls 525C, 525D that surround and define opening 515. A seat 522 extends along an interior surface of sidewall 525 proximate to an upper edge 524 of the sidewall. A circular opening 535 for receiving a plug connector, e.g., a standard audio plug, is shown in wall 525B but in other embodiments opening 535 can be formed in one or more of the other walls 525A, 525C, 525D in addition to or instead of wall 525B. Opening 535 communicates with a cavity 536 formed within audio jack shell 505 in which receptacle connector contacts (e.g., contacts 530 shown in FIG. 7A) that correspond to contacts on the plug connector are positioned.

Front cover portion 540 includes a frame 545 and a cover glass 550 assembled therewith. In addition to supporting cover glass 550, frame 545 can support a display (not shown) positioned underneath and visible through cover glass 550 along with other components of an electronic device housed within enclosure 500. An outer perimeter of front cover portion 540 is sized and shaped similar to, but slightly smaller than, opening 515 in housing 510 such that it fits within opening 515 and is supported by seat 522 and other interlocking features, such as projections configured to fit within bores 526 shown in FIG. 6A).

First section 502 of the audio jack shell is integrally formed with both back portion 520 and bottom wall 525B of housing 510, and second section 504 of the audio jack shell is integrally formed with frame 545 of front portion 540. First and second sections 502 and 504 combine to form a complete audio jack shell 505 having a cavity 536 in which audio jack contacts 530 can be positioned or formed (see FIG. 7B). In the embodiment depicted in FIG. 5, each of sections 502 and 504 make up approximately one half the height of the audio jack. Such a design makes it easy to install contacts 530 within the audio jack and makes it easy to seal the two portions of the audio jack together to create a water tight enclosure. In other embodiments, however, one of sections 502 or 504 may make up more than half the height of the audio jack with the other of sections 502 making up the difference. In still other embodiments, a dividing line between sections 502 and 504 is not planar. For example, in one embodiment mating surfaces 506 and 508 may have one or more complimentary steps. In another embodiment, one side of mating surface 506 may be lower or higher than the other with the corresponding side of mating surface 508 being higher or lower, respectively.

Figure 6A:
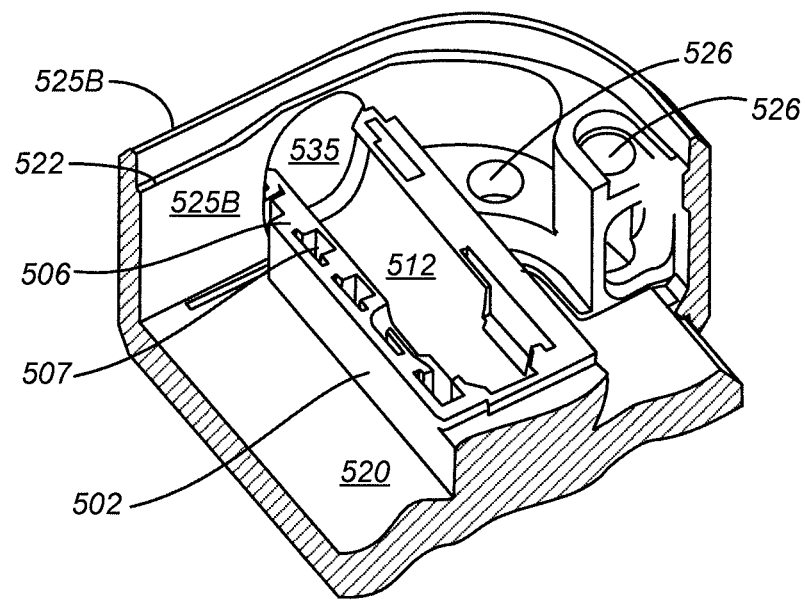
FIG. 6A is a partial perspective view of a housing portion of an electronic device enclosure integrally formed with a first portion of an audio jack connector shell according to an embodiment of the invention.

As shown in FIG. 6A, first section 502 includes a first mating face 504 around a perimeter of section 502. A first interior surface 512 lies within section 502 and defines a bottom portion of cavity 536. A plurality of slots 507 are formed along the perimeter of section 502 and configured to accept portions of contacts 530 such that the contacts can be securely attached to audio jack 505 and positioned within cavity 536. As also shown in FIG. 6A, housing 510 further includes various bores and/or cutouts 526 that align with projections formed on front cover 540 (not shown) to securely attach the front cover to the housing.

In one embodiment, housing 510 is formed from a single piece of polymer or metal and the various features formed in the housing, including first section 502, sidewall 525, openings 515 and 535, slots 507 and bores/cutouts 526 are formed by milling the single piece of polymer metal using known milling techniques (e.g., using computer numerical control (CNC) of a machining tool). In another embodiment, housing 510 including first section 502 may be formed by injecting molten polymer, e.g., thermoplastics, or glass filled resin, e.g., glass reinforced nylon, into a mold, i.e., injection molding, so as to form a single piece of polymer. Alternatively, enclosure 500 may be formed by molding Liquidmetal or a metal injection molding process (MIM) to form a single piece of metal, e.g., stainless steel. It is desirable for the interior portions of section 502, including surface 512 and the surfaces within slots 507, to be nonconductive so that each individual contact in contacts 530 is electrically isolated from other contacts in contacts 530. Thus, when housing 510 and section 502 are milled from a single piece of metal or formed by molding Liquidmetal or in a MIM process, in some embodiments of the invention the interior surface of the entire housing or portions of the housing including section 502 can be covered with a nonconductive coating.

In another embodiment, back 520 and sidewall 525 can be formed from a single piece of polymer or metal and section 502 can be integrally formed with back 520 and sidewall 525 using an injection molding process. For example, one or more grooves (not shown) can be formed in back 520 and/or sidewall 525, and section 502 may then be injection molded from a plastic material that flows into the grooves thereby forming a unified body for housing 510 and first section 502. In one embodiment, the grooves may have an opening at the interior surface of back 520 or sidewall 525 that is narrower than a channel or main portion of the groove thereby locking the injection plastic material to be securely locked to back 520 and/or sidewall 525. In some embodiments, back 520 and sidewall 525 are formed with milling techniques as discussed above. In still other embodiments, a two shot injection molding process can be used to form housing 510. For example, a first shot of the process can be used to form back 520 and sidewall 525 and a second shot of the process can be used to form section 502. A two shot process allows the materials for each shot to be selected for specific properties that are desirable for the individual components being formed. For example, if the first shot is used to form back 520 and sidewall 525, a polycarbonate or similar non-glass filled resin or plastic material can be selected for the first shot that has excellent cosmetic features and is highly scratch resistant. A hard and stiff plastic material (e.g., a glass-filled LCP material) can then be selected based on its structural properties for the second shot and used form section 502.

Figure 6B:
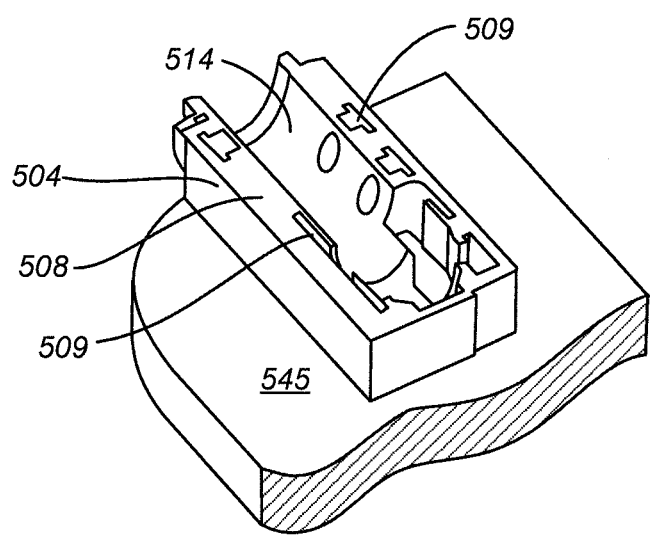
FIG. 6B is a partial perspective view of a front cover portion of an electronic device enclosure integrally formed with a second portion of an audio jack shell integrally according to an embodiment of the invention.

Referring now to FIG. 6B, second section 504 includes a second mating face 508 around a perimeter of section 504. A second interior surface 514 lies within section 504 and defines a top portion of cavity 536. Multiple second slots 509 are formed along the perimeter of section 504 and configured to accept portions of contacts 530. Slots 507 and 509 thus combine to anchor contacts 530 to audio jack 505 securing the contacts within cavity 536. Font cover 540 may also include one or more projections (not shown) that align with one or more of bores and/or cutouts 526 formed in housing 510 to securely attach the front cover to the housing. In one embodiment, front cover 540 is formed from plastic using an injection molding process.

Sections 502 and 504 can be joined together when front cover 540 is joined to housing 510 to form audio jack shell 505. In one embodiment ultrasonic welding techniques can be used to join face 506 to face 508. To improve the strength of the joined sections and to form a more water-tight seal, various joints (not shown) can be formed along mating faces 506, 508. For example, a tongue and groove joint, a step joint, a shear joint, or other appropriate joint designs can be incorporated into mating faces 506, 508. In other embodiments, an adhesive can be applied to one or both of mating faces 506 and 508 and/or a sealant or gasket can be employed between the two mating faces, for example in a groove, or around the two mating faces to improve the water resistance of the audio jack shell 505 and prevent liquid from passing from cavity 536 into an interior of enclosure 500 housing electronic components and other portions of the electronic device formed within enclosure 500. In still other embodiments, other known and appropriate bonding techniques can be used. Also, while not shown in the figures, sections 502 and 504 can be formed with projections and holes along the perimeter of each that align with each other and facilitate a stronger bond or connection between the parts, for example, by using a press-fit connection or similar technique.

Figure 7A:
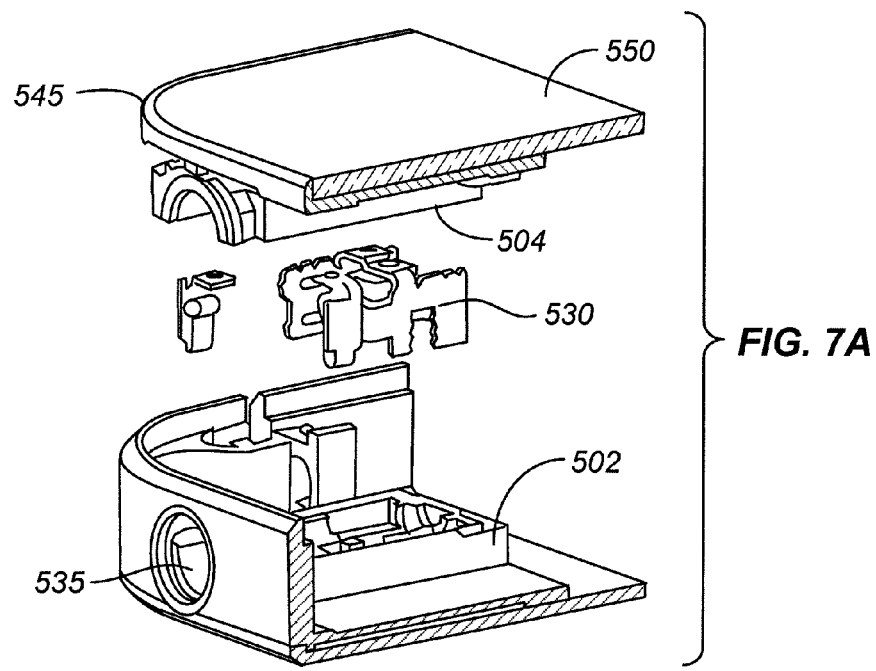
FIG. 7A illustrates a perspective sectional view of an audio jack shell according to an embodiment of the invention prior to assembly.
Figure 7B:
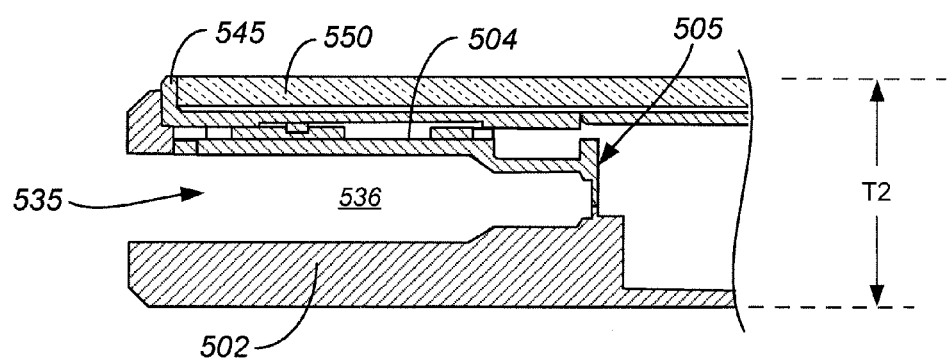
FIG. 7B illustrates a cross-sectional view of the audio jack shell shown in FIG. 6A within an enclosure according to an embodiment of the invention.

As shown in FIG. 7A, metal contacts 530 are positioned within cavity 536 formed by sections 502 and 504 by aligning various legs or cutouts of the contacts with slots 507 and 509 in first and second sections 502 and 504, respectively. In one embodiment, audio jack shell 505 houses four separate contacts 530 (left audio, right audio, ground and microphone) spaced apart along a depth of the cavity for coupling to a TRRS connector as shown in FIG. 3B. In one embodiment, contacts 530 can be integrally formed within audio jack shell 505 and insert molded within shell 505 by, for example, an overmolding process applied to one of sections 502 or 504 prior to or after the sections are joined. In another embodiment, before sections 502 and 504 are joined the contacts can be assembled within slots 507 and 509 using a press-fit or similar connection. In either case, contacts 530 can be bonded to wires or leads that connect the contacts to appropriate circuitry to the electronic device formed within enclosure 500.

Referring now to FIG. 7B, once housing 510 and front cover portion 540 are joined together, the overall height of enclosure 500 can be made thinner than enclosure 400 shown in FIG. 4B (e.g., by having a thickness T2 that is less than T1), and the total amount of space audio jack shell 505 takes up within enclosure 500 can be less than the space jack 405 takes up within enclosure 400, because audio jack 505 can have the same or even a stronger structural integrity as compared to audio jack 405 with walls that are considerably thinner. Additionally, no screws or other attachment mechanisms are necessary to attach audio jack 505 to enclosure 500. Instead, the audio jack is integrated directly into enclosure 500 which makes the entire enclosure and the audio jack more robust. Additionally, as compared to traditional enclosure 400 (shown in FIGS. 4A-B and discussed above), the overall depth in which audio jack shell 505 extends towards top wall 515 may be reduced by not including a trim (e.g., trim 460 as shown in FIG. 4B) or a trim gasket (e.g., gasket 455 as shown in FIG. 4B). Not including a trim eliminates cosmetic gaps between an enclosure and the trim. However, the potential for liquid ingress at the interface of the enclosure 500 and the audio jack 505 is also eliminated by virtue of the elimination of the cosmetic gaps. Hence, trim gaskets may not be needed for enclosure 500 to fill gaps at seams between parts to prevent liquid ingress.

In some embodiments, it may be desirable to include a trim, as discussed with regards to the prior art in the enclosure embodiments described above in order to prevent wear caused by inserting and extracting plug connectors, e.g., TRRS audio plug connectors, into and from opening 535 of enclosure 500. The trim, which may be made from a metallic material, may be assembled with the enclosure and surround opening 535. Cosmetic gaps between the enclosure and the metal trim can be removed by virtue of an insert molding process that may fill in potential gaps at the seams between the enclosure and the metal trim.

Although not shown in FIG. 5, 6A-6B or 7A-7B, in some embodiments, enclosure 500 may also include one or more additional openings (in addition to opening 535) for providing access to more than one receptacle connector. For example, enclosure 500 may include openings for two receptacle connectors such as receptacle connectors 230 and 235 (as shown in FIG. 2). Furthermore, one or more of the additional receptacle connectors may be integrated with embodiments of enclosure 500 in addition to or instead of audio jack 505.

Other components described herein may be integrally formed with an audio jack shell that is integrally formed with an enclosure, according to embodiments of the present invention. That is, components adjacent to audio jack shells could share one or more walls with the audio jack shell. Other components could also be formed integrally within the enclosure regardless of their proximity to the audio jack housing. For example, components could be integrated with walls of the enclosure or just the back portion of the enclosure.

Also, while a number of specific embodiments were disclosed with specific features, a person of skill in the art will recognize instances where the features of one embodiment can be combined with the features of another embodiment. For example, some specific embodiments of the invention set forth above were illustrated with audio jacks. A person of skill in the art will readily appreciate that any of the types of receptacle connectors described herein may be integrally formed with an enclosure, as well as other internal components specifically mentioned herein and not specifically mentioned herein. Also, those skilled in the art will recognize, or be able to ascertain using no more than routine experimentation, many equivalents to the specific embodiments of the inventions described herein. Such equivalents are intended to be encompassed by the following claims.

What is claimed is:

1. An electronic device enclosure, comprising:
    a housing having a back portion and an outer sidewall extending from the back portion around an outer periphery of the electronic device enclosure;
    an opening in the outer sidewall that communicates with a cavity;
    a frame coupled to the housing and configured to receive a display cover;
    a first section of a connector shell integrally formed with the back portion and outer sidewall and extending from the back portion towards the frame, the first section having a first mating surface and a first interior surface, the first mating surface extending around a periphery of the first section and surrounding the first interior surface except at the opening;
    a second section of the connector shell integrally formed with the frame and extending from the frame towards the back portion, the second section including a second mating surface and a second interior surface, the second mating surface extending around a periphery of the second section and surrounding the second interior surface except at the opening, wherein the second mating surface is aligned with the first mating surface and the first and second interior surfaces combining to form the cavity; and
    a plurality of contacts positioned in the cavity.

2. The electronic device enclosure set forth in claim 1 wherein the connector shell is an audio jack connector shell configured to receive an audio jack plug inserted through the opening.

3. The electronic device enclosure set forth in claim 2 wherein each of the first and second sections comprise approximately half a depth of the audio jack connector shell.

4. The electronic device enclosure set forth in claim 1 wherein the first section includes a first plurality of slots formed in or adjacent to the first mating surface, the second section includes a second plurality of slots formed in or adjacent to the second mating surface, and the plurality of contacts include portions that mate with one or more of the plurality of slots.

5. The electronic device enclosure set forth in claim 1 wherein the first and second mating surfaces are joined together by an ultrasonic weld.

6. The electronic device enclosure set forth in claim 1 wherein a joint is formed along at least one of the first and second mating surfaces to form a more water-tight seal between the surfaces.

7. The electronic device enclosure set forth in claim 1 wherein the outer sidewall includes an upper edge around its periphery and a seat extending along an interior surface of the outer sidewall proximate to the edge, and wherein the frame is supported by the seat.

8. The electronic device enclosure set forth in claim 7 wherein the outer sidewall and back are part of the housing that includes one or more cutouts or bores and wherein the frame includes one or more projections that align with the one or more cutouts or bores.

9. The electronic device enclosure set forth in claim 8 wherein the one or more projections from the frame are joined to the housing by a press-fit connection in the one or more cutouts or bores.

10. An electronic device enclosure, comprising:
    a housing having a back portion and an outer sidewall extending from the back portion around an outer periphery of the electronic device enclosure, the outer sidewall including an upper edge around its periphery and a seat extending along an interior surface of the outer sidewall proximate to the edge;
    an opening in the outer sidewall that communicates with a cavity;
    a frame supported by the seat and having a window for a display cover;
    a connector shell including a first section integrally formed with the housing and extending from the back portion towards the frame and a second section integrally formed with the frame and extending from the frame towards the back portion, the first section having a first mating surface and a first interior surface, the first mating surface extending around a periphery of the first section and surrounding the first interior surface except at the opening, the second section including a second mating surface and a second interior surface, the second mating surface extending around a periphery of the second section and surrounding the second interior surface except at the opening, wherein the second mating surface is aligned with the first mating surface and the first and second interior surfaces combining to form the cavity; and
    a plurality of contacts positioned in the cavity.

11. The electronic device enclosure set forth in claim 10 wherein the connector shell is configured to receive an audio jack plug inserted through the opening and the plurality of contacts include first, second, third and fourth contacts spaced apart along a depth of the cavity.

12. The electronic device enclosure set forth in claim 10 wherein the opening is formed in a bottom sidewall of the enclosure.

13. The electronic device enclosure set forth in claim 10 wherein the back portion and outer sidewall of the housing are formed from an injection molding process.

14. The electronic device enclosure set forth in claim 10 wherein the first section of the connector shell is also formed from an injection molding process.

15. The electronic device enclosure set forth in claim 10 wherein the back portion and outer sidewall of the housing are formed from a first shot of an injection molding process and the first section of the connector shell is formed integral with the back and outer sidewall from a second shot of an injection molding process.

16. The electronic device enclosure set forth in claim 15 wherein the back portion and outer sidewall of the housing are formed from a non-glass filled resin material and the first section of the connector shell is formed from a glass filled LCP plastic.

17. The electronic device enclosure set forth in claim 10 wherein the back portion, outer sidewall and the first section are formed from a single piece of metal with a nonconductive coating covering at least the first interior surface of the first section.

18. The electronic device enclosure set forth in claim 10 wherein the back portion and outer sidewall are formed from a single piece of metal and the first section is formed with an injection molding process.

* * * * *